June 3, 1930. H. G. LYKKEN 1,761,138
DEVICE FOR REDUCING MATERIALS
Filed Feb. 23, 1926
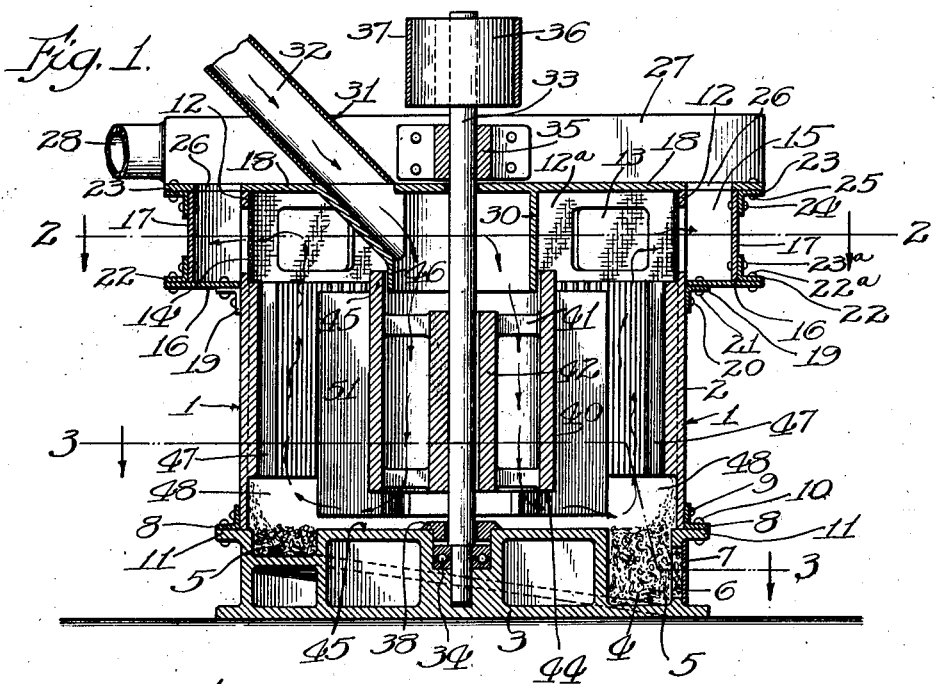
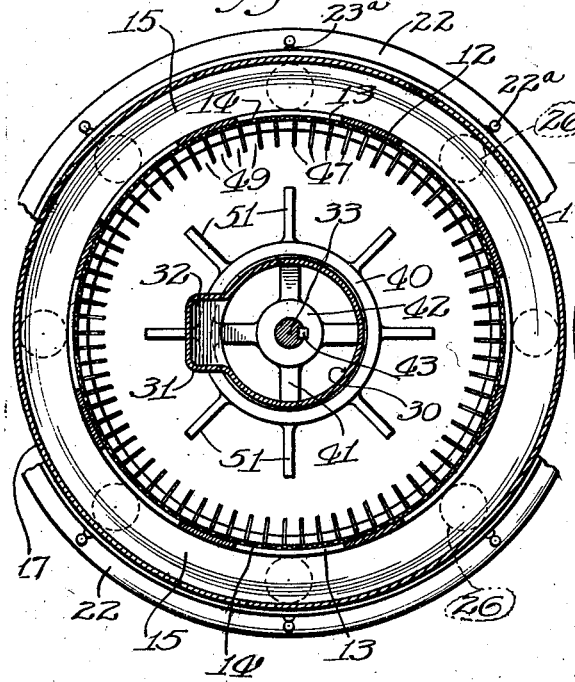
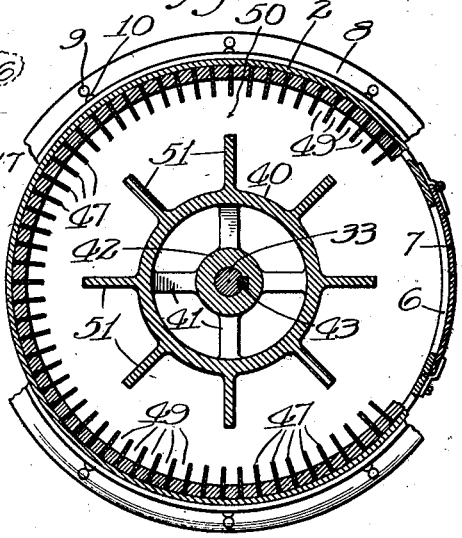
Inventor:
Henry G. Lykken
By: Wallace R. Lane
Atty.

Patented June 3, 1930

1,761,138

UNITED STATES PATENT OFFICE

HENRY G. LYKKEN, OF MINNEAPOLIS, MINNESOTA

DEVICE FOR REDUCING MATERIALS

Application filed February 23, 1926. Serial No. 89,973.

The present invention relates to devices for reducing materials to a desired fineness or size.

Among the objects of the invention is to provide a novel reducing means capable of operating upon any desired reducible matter, such as friable matter and particular fibrous material with or without cutting upon cutting edges of cutting blades or the like, and reducing the same to the desired fineness or size, by the action of air upon the material to be reduced or by the action of relatively moving stressed masses of material and air, the latter also acting as a carrying or conveying medium, and, when cutting is to be effected by the cutting of the material by the cutting edges, such cutting being effected in different rotations of the material for efficient cutting thereof.

As a feature of the invention, the latter comprehends the supplying of the air and material to be reduced, into the means for effecting the reducing, such that an initial stressing of the material and the air may be effected prior to the supplying of the same into the reducing region. This may be obtained by the provision of a rotor which is preferably reversible and rotatable about an upright or vertical axis and also preferably hollow or provided with a passage for receiving the supply at one end thereof and discharging the same from the other end thereof in stressed condition, the discharged material and air being centrifugally expressed to the interior of the chamber in which the reducing is effected. When cutting is to be effected, as against cutting edges of replaceable and renewable edge carrying bars or strips, reversible rotation of the rotor may be effected to present the material to the new cutting edge which was produced by the previous wearing and beveling of the previous cutting edge in the opposite rotation of the material. This provides for a self-sharpening mill.

Another object of the invention is to provide for the extraction or separation of the non-reducible substances or objects that might be included in the material of the supply, this separation or extraction being effected before the supply reaches the reducing region, as by providing a receiving or collecting pocket or chamber below discharge end of the rotor and also below the reducing region or at the lower end of the reducing chamber, the pocket or chamber being preferably annular and inclined or with an inclined floor for facilitating the movement of the collected material to a low point of the chamber where the non-reducible objects and the like may be readily removed. The entraining action of the rotor will also aid in causing a gradual movement of the material in the pocket or chamber, such movement being similar to or analogous to that of a glacier where the heavy material, such as rocks and the like may gradually sink during the slow movement of the ice and snow. In this invention the pocket is filled with reducible and non-reducible material and as the same is caused to move around in the pocket, the non-reducible objects will gradually sink through the reducible material, the latter gradually rising to the surface to be entrained into the reducing region by the action of the rotor.

The invention also comprehends, whether or not including the above features, the provision of a reducing chamber with the side walls thereof substantially spaced from the peripheral parts of the rotor to provide a free and substantial reducing region around the rotor and between the rotor and the side walls of the chamber, the rotor acting to entrain air and material into said space and to cause a whirlpool or cyclonic action or an eddy whereby the air and material are carried around the outside of the rotor and in the reducing region with the inner layers or strata, as those more proximate to the peripheral parts of the rotor, moving or traveling at a greater rate than those more remote therefrom, the effect at the same time including centrifugal forces or stresses acting radially outwardly so that the particles of the inner or more rapidly moving layers or strata will abrade or erode against the particles of the adjacently located and slower moving layers or strata and also to effecting a cutting of the material being moved by and over the cutting edges of the cutting bars or strips that may be provided in the side walls of the reducing chamber. The material and air will thus rotate in the reducing region while at the same time gradually rise with the reduced particles in more or less suspended condition or the like, to a separating region, and preferably to a mixing or diffusing means. The unreduced and heavier particles will be forced toward the chamber walls and descend to the lower part of the chamber for re-entraining and re-reduction in the reducing region, or for further cutting against the cutting edges.

Another object of the invention is to provide means for effecting cutting of the material when of the fibrous type or the like and for retarding, anchoring or stopping the movement of the outer or more remote layers or strata of the eddy, such as those layers or strata adjacent to or contacting with the side walls of the reducing chamber. This means, in a specific illustrative embodiment, comprises a series of spaced and replaceable bars having cutting edges and secured to or otherwise engaging the side walls of the reducing chamber and providing vertical or upright grooves or channels between the bars. The radial stresses imposed upon the material in the reducing region will cause some of the material to engage these bars and be cut or sheared thereby, and some of the material will engage into the grooves therebetween, so as to retard the movement of the outer layers or strata of the eddy or to anchor or hold such material relatively stationary, but permitting the material to gradually move downwardly in the grooves or channels to the lower end of the chamber and to the lower end of the reducing region where the material may again be picked up by and entrained into the eddy in the reducing region, for re-reduction or further reduction.

The invention has, as another of its features, the provision of a novel separating and expanding means, preferably in the form of a chamber above the rotor and above the reducing region. This may be provided by the side walls of the reducing chamber extending upwardly above the upper end of the rotor, the upper end of the reducing region serving as a discharge passage for the eddying reduced material and air to the separating chamber. The mass of particles and air will circulate in the upper chamber and permit the heavier and larger particles to descend by gravity along the side walls of the reducing chamber and into the channels between the retard bars and thence to the lower end of the reducing chamber for re-entraining and re-reduction in the reducing region. The separating and expanding chamber also preferably has a number of outlet ports and screens or the like covering the ports for permitting the passage therethrough of particles of given fineness and holding back the larger particles which will course down the screen surfaces and into the channels between the retard bars and thence to the lower end of the reducing chamber for re-entraining and re-reduction in the reducing region.

Another object of the invention is to provide means for receiving the fine particles and air discharged through the screened ports, this means being preferably located to surround said ports and being provided with discharge openings for supplying the fine particles and air to a discharge chamber which may be located above the receiving chamber and have a suitable discharge conduit connected thereto to discharge or conduct off the fine particles and air to a place of use, storage or the like.

Another feature of the invention is to provide a novel rotor having an axial passage for the material to be acted upon, and with radial vanes or the like for effecting the eddy or cyclonic action above mentioned, these vanes preferably extending radially outwardly to and toward the reducing region, the latter being located between the outer ends of these vanes and the inner edges of the retard bars. The invention also comprehends the idea of the rotor being reversible in rotation for compensating for wear of the parts, such as the inner edges of the retard or cutting bars. After the rotation in one direction for a time, the edges of the retard bars may be worn with a bevel or the like in one direction. The reverse rotation of the rotor will effect an opposite result and in this way the efficiency of the device may be maintained with a longer life of the parts.

The invention also includes other objects, advantages, capabilities and features which will later appear and are inherently possessed by the invention.

In the drawings, Fig. 1 is a vertical transverse sectional view of a device constructed in accordance with the invention.

Fig. 2 is a horizontal sectional view taken in a plane represented by line 2—2 in Fig. 1 of the drawings.

Fig. 3 is a horizontal sectional view taken in a plane or planes represented by lines 3—3 in Fig. 1 of the drawings.

Referring now more in detail to the drawings, the embodiment selected to illustrate the invention is shown as comprising a chamber 1 having side walls 2 and supported upon a base member 3 having an annular chamber or pocket 4, the floor 5 of which is inclined or pitched from one side of the member 3 to the opposite side where there is provided an opening 6 normally closed by a door 7. The chamber 1 may be secured or fastened to the member 3 by any suitable means, such as angle pieces 8 and rivets or bolts 9 and 10, the latter being secured to flanges 11 of the base member 3.

The side walls 2 of the chamber 1 extend upwardly to form a wall 12 provided with a number of ports 13 which may be covered by a screen or the like 14 with the mesh or perforations desired for permitting the given size of particles to pass therethrough and through the ports 13. Surrounding the ports 13 and located outside of the same, is a chamber 15, which may be of annular form and provided with a floor or bottom 16, side walls 17 and a top 18, the top 18 also extending over the chamber provided at the upper end of the chamber 1. The bottom wall or floor 16 may be secured to the side walls of the chamber 1 by any suitable means, such as angles 19 secured in place by the rivets or bolts 20 and 21 respectively to the side walls of the chamber 1 and the floor 16 of the chamber 15. The side walls 17 may be secured similarly by angles 22 and 23 respectively to the floor 16 and top wall 18 by bolts or rivets 22ª, 23ª, 24 and 25. The top wall 18 may be provided with a number of openings or discharge outlets 26 communicating with the chamber 15 and a chamber 27 located above the top member 18 and providing a discharge chamber for the material, this chamber being connected with any suitable discharge conduit 28 or the like for conducting the material to a place of use, storage or the like.

Depending from the top wall 18 may be provided a cylindrical skirt 30 extending a short distance into the space in the chamber 1, and being provided with a lateral and upwardly extending passage or chute 31 to which may be connected a similar passage 32 passing through the chamber 27 and proceeding from any source of material, such as a hopper or the like, the passages 31 and 32 together with the skirt 30 serving as a means for the supply of material and air through the reducing device.

Within the chamber 1 and centrally thereof is provided a shaft 33 supported at one end in ball bearings 34 carried in the member 3, and rotatably supported in a bearing 35 suitably mounted in the chamber 27 above the top plate 18, the shaft extending upwardly out of the device and having at its upper end a pulley or the like 36 adapted to receive a driving belt 37 for rotating the shaft in either direction desired. A plug or cover plate 38 may be provided at the lower end of the shaft for preventing the materials having access to the ball bearings 34. While the shaft is described as having its upper ends extending upwardly through the device for operation through the pulley, it is to be understood that the invention is comprehensive enough to have the shaft extend through the bottom of the device and have the pulley attached to that end for similar operation.

Secured to the shaft 33 is a rotor 40 preferably of hollow cylindrical form and having radial arms or spiders 41 for connecting the cylindrical portion of the rotor to a hub 42 fixed to the shaft 33 in any suitable manner, as by a key or spline 43, the rotor being open at both ends and being disposed preferably to rotate about an upright or vertical axis, such as the axis of the shaft 33. The lower end 44 of the rotor is preferably spaced a suitable distance above the floor or top 45 of the base member 3 so as to provide a passage between the lower end of the rotor and the base member 33 radially toward the side walls of the chamber 1. The upper end 45 of the rotor extends a short distance above the lower end 46 of the skirt 30 and in close proximity to the same as well as surrounding the lower end portion 46. In this way the interior of the rotor communicates with the passage of the conduit 31—32 and the space of the skirt 30.

Within the chamber 1 and engaging or secured to the inner faces or side walls 2 of this chamber, is provided a series of vertical bars or the like 47, the inner edges of these bars extending a short distance from the inner faces of the chamber and the bars being spaced from each other to provide vertical grooves or channels therebetween and extending for a part of the vertical height of the chamber walls, but terminating short at the lower part of the chamber to provide an annular space or chamber 48 at the lower part of the chamber 1 as clearly shown in Fig. 1 of the drawings. The channels 49 between the bars 47 are open at the upper and lower ends thereof to provide passages for material downwardly in the channels from either the interior chamber 1 or from the chamber 12ª to and into the chamber portion 48 for the purpose hereinafter described. Moreover, it will be observed that the bars 47 have their inner edges at a substantial distance between the rotor 40 for providing an intermediate annular space 50 in which the eddy or cyclonic action is effected and which may be termed a reducing region of the device. The rotor has radially extending wings 51 for creating the eddy and for entraining the material into the eddy when the rotor is rotating, it being observed that the eddy action occurs beyond or without the outer ends of the wings 51 and within the inner edges of the bars 47.

In the operation of the device the material with air, whether under pressure or not, is fed through the conduits 31 and 32 and the space of the skirt 30 into the upper end of the rotor, the material passing either by gravity or by pressure toward the lower end of the rotor, while at the same time being whirled or rotated with the rotor to impress upon the material an initial centrifugal action or radial stresses. The material and air will then discharge from the lower end of the rotor into the space between the lower end thereof and the top 45 of the member 3 and cause the travel radially outwardly into the chamber 48 and also into the channel 4 which serves as a collecting or receiving pocket for the non-reducible objects and substances. At the same time the wings 51 will set up or create a whirl or eddy of air within the chamber which will move or rotate in the reducing region 50 and move in the same direction as the rotor but with the inner layers or strata of the eddy traveling at a greater rate than the more remote layers or strata. The centrifugal action of the rotor will prevent any of the air being entrained in between the wings. Initially some of the reducible material will fill the channel space 40 with some of the non-reducible material, but after the device has started, the entraining action of the rotor will help in causing the gradual movement of the material in the channel 4 in the direction of rotation of the rotor so that there is a continual working of the material in the channel 4 similar to that of ice and snow in a glacier. The channel 4 has its floor inclined or pitched so as to aid in this movement from a high point to a low point opposite the floor 6—7. During this movement the non-reducible objects will sink and work their way downwardly in the material in the channel and also cause the reducible material to work toward the surface and be entrained by the action of the rotor into the reducing region.

When the material is first discharged from the rotor, it will be thrown or cast centrifugally into the chamber 48 and against the side walls 2 of the chamber 1. Further rotation of the rotor will cause entraining or picking up some of the particles of material from the surface thereof and cause the same to mix with the air eddying around the rotor and owing to the general movement of the material into the machine, there will be a gradual rising of this mixture toward the upper end of the chamber so that the air and particles may pass upwardly into the chamber 12$^a$. During this eddying and rising, the particles carried by the air, will be stressed radially outwardly so that the inner layers or strata of the material and air or those more proximate to the rotor periphery, will move at a greater rate and yet with outward pressure against the adjacent more remote layers or strata so that there will be a contact of particle against particle with abrading and erosion thereof so as to reduce the same. The outer or more remote layers or strata of the material will engage with the strips or bars 47 to effect a cutting or shearing action, and some will also enter between the bars and will be retarded in their movements or held stationary relative to the rotating parts of the eddy. The latter material may then gradually move or course downwardly in the channels 49 to the lower part of the chamber 1 and into the chamber 48 for re-entraining and re-reduction.

The reduced particles and air will move upwardly from the reducing region into the chamber 12$^a$ for thorough mixing, expansion and separation, the grid helping to increase the mixture and diffusion. The screen 12 will then sift or sieve the material as it passes through the ports 13 to the receiving chamber 15, the coarse material not permitted to pass then coursing down over the surface of the screen and into the channels 49 and thence down into the chamber 48 for re-entraining and re-reduction. The material permitted to pass through the screen with the air will then pass into the chamber 15 and through the ports 26 into the chamber 27 and finally through the duct 28 for conveyance to a place of use, storage or the like.

The rotor may rotate in any direction desired and when used for a time and rotated in one direction, the movement of the material in the reducing region and being cut by the cutting edges, will, after a time, cause a wearing away at the edges of the bars 47 with a bevel inclined in the direction of rotation. The rotor may then be rotated in an opposite direction for a desired period so that material may move against the new cutting edge and be cut thereby in the opposite direction from that previously. In this way the life of the blades may be increased as well as the efficiency thereof maintained. When the blades are worn to the extent that the channels 49 are shallow, these blades may be removed from the wall of the chamber and new blades readily inserted in their place, thus making it possible to renew the means for holding or retarding the material in the chamber.

While I have herein described and upon the drawings shown an illustrative embodiment of the invention, it is to be understood that the invention is not limited thereto but comprehends other constructions, details, arrangements of parts and features without departing from the spirit thereof.

Having thus disclosed the invention, I claim:

1. A reducing device of the character described comprising a chamber, a rotor mounted in said chamber and having a passage therethrough, said chamber being of larger diameter than the rotor to provide a substantial clearance space, so that a cyclonic action may be set up within said space by the operation of said rotor, and means for supplying material through said rotor to said clearance space, the difference in the diameters of the rotor and the clearance space being such that the material discharged thereinto through the rotor will be reduced by the whirling action of air within said space produced by the action of the rotor.

2. A reducing device of the character described comprising a chamber, a rotor mounted in said chamber and surrounded by a substantial clearance space, said rotor having a passage therethrough, means for supplying material to said passage so as to be dscharged into said clearance space, said rotor having means for simultaneously creating a cyclonic action in the clearance space so that the material will be reduced by the whirling action of the air in said space, and means at the lower part of said chamber for collecting non-reducible material.

3. A reducing device of the character described comprising a chamber, a rotor mounted in said chamber and surrounded by a substantial clearance space, said rotor having a passage therethrough, means for supplying material to said passage so as to be discharged into said clearance space, said rotor having means for simultaneously creating a cyclonic action in the clearance space so that the material will be reduced by the whirling action of the air in said space, means at the lower part of said chamber for collecting non-reducible material, and a closure means for said collecting means positioned to afford access to said collecting means so that the non-reducible material may be removed.

4. A reducing device of the character described comprising a chamber, a rotor mounted in said chamber and surrounded by a substantial clearance space, said rotor having a passage therethrough, means for supplying material to said passage so as to be discharged into said clearance space, said rotor having means for simultaneously creating a cyclonic action in the clearance space so that the material will be reduced by the whirling action of the air in said space, outlet means positioned in the upper part of said chamber, and means above said outlet means for separating the larger and heavier particles of material for re-reducing.

5. A reducing device of the character described comprising a chamber, a rotor mounted in said chamber and surrounded by a substantial clearance space, said rotor having a passage therethrough, means for supplying material to said passage so as to be discharged into said clearance space, said rotor having means for simultaneously creating a cyclonic action in the clearance space so that the material will be reduced by the whirling action of the air in said space, outlet means positioned in the upper part of said chamber, and a screen associated with said outlet means for returning insufficiently reduced particles of material.

6. A reducing device of the character described comprising a chamber, a rotor mounted in said chamber and surrounded by a substantial clearance space, said rotor having a passage therethrough, means for supplying material to said passage so as to be discharged into said clearance space, said rotor having means for simultaneously creating a cyclonic action in the clearance space so that the material will be reduced by the whirling action of the air in said space, and an annular collection pocket at the lower end of said chamber.

7. A reducing device of the character described comprising a chamber, a rotor mounted in said chamber and surrounded by a substantial clearance space, said rotor having a passage therethrough, means for supplying material to said passage so as to be discharged into said clearance space, said rotor having means for simultaneously creating a cyclonic action in the clearance space so that the material will be reduced by the whirling action of the air in said space, an inclined annular collection pocket at the lower end of said chamber, and a door at the lowest part of said pocket for affording access thereto so as to effect removal of non-reducible material.

8. A reducing device of the character described comprising a chamber, a rotor mounted in said chamber and surrounded by a substantial clearance space, said rotor having a passage therethrough, means for supplying material to said passage so as to be discharged into said clearance space, said rotor having means for simultaneously creating a cyclonic action in the clearance space so that the material will be reduced by the whirling action of the air in said space, and a series of retard members in said chamber and in spaced relation with respect to said rotor.

9. A reducing device of the character described comprising a chamber, a rotor mounted in said chamber and having a passage therethrough, said chamber being of larger diameter than the rotor to provide a substantial clearance space so that a cyclonic action may be set up within the clearance space by the operation of said rotor, means for supplying material through the rotor to said clearance space, the difference in the diameters of the rotor and the clearance space being such that the material discharged thereinto through the rotor will be reduced by the whirling action of the air within said space produced by the rotor, and retard members carried by the walls of said chamber and surrounding said clearance space so as to hold or retard movement of the outer layers of the material which is undergoing cyclonic action within said space.

10. A reducing device of the character described comprising a chamber, a rotor mounted in said chamber and having a passage therethrough, said chamber being of larger diameter than the rotor to provide a substantial clearance space so that a cyclonic action may be set up within the clearance space by the operation of said rotor, means for supplying material through the rotor to said clearance space, the difference in the diameters of the rotor and the clearance space being such that the material discharged thereinto through the rotor will be reduced by the whirling action of the air within said space produced by the rotor, and circumferentially spaced longitudinally disposed retard members secured to the walls of said chamber.

11. A reducing device of the character described comprising a chamber, a rotor mounted in said chamber and having a passage therethrough, said chamber being of larger diameter than the rotor to provide a substantial clearance space, so that a cyclonic action may be set up within said space by the operation of said rotor, means for supplying material through said rotor to said clearance space, the difference in the diameters of the rotor and the clearance space being such that the material discharged thereinto through the rotor will be reduced by the whirling action of air within said space produced by the action of the rotor, the walls of said chamber extending above the rotor and being provided with outlet ports, an annular chamber surrounding said wall extension and said ports, and a screen covering said ports.

12. A reducing device of the character described comprising a chamber, a rotor mounted in said chamber and having a passage therethrough, said chamber being of larger diameter than the rotor to provide a substantial clearance space, so that a cyclonic action may be set up within said space by the operation of said rotor, means for supplying material through said rotor to said clearance space, the difference in the diameters of the rotor and the clearance space being such that the material discharged thereinto through the rotor will be reduced by the whirling action of air within said space produced by the action of the rotor, the walls of said chamber extending above the rotor and being provided with outlet ports, an annular chamber surrounding said wall extension and said ports, said annular chamber having ports in the upper wall thereof, and another chamber above said annular chamber and communicating with the same through the ports in the upper wall of said annular chamber.

13. A reducing device of the character described comprising a chamber, a rotor mounted in said chamber and having a passage therethrough, said chamber being of larger diameter than the rotor to provide a substantial clearance space, so that a cyclonic action may be set up within said space by the operation of said rotor, means for supplying material through said rotor to said clearance space, the difference in the diameters of the rotor and the clearance space being such that the material discharged thereinto through the rotor will be reduced by the whirling action of air within said space produced by the action of the rotor, the side walls of said chamber being extended upwardly to provide a separating chamber above the rotor, and means for conducting the air and fine particles from said separating chamber.

14. A reducing device of the character described comprising a chamber, a rotor therein mounted to rotate about an upright axis, a collecting pocket below said rotor and said chamber for receiving non-reducible material, a separating compartment located above said rotor and said chamber, and means for supplying material to said rotor so as to be reduced.

15. A reducing device of the character described comprising a chamber, a rotor in said chamber surrounded by a substantial clearance space, said motor being mounted to rotate about an upright axis and having a passage therethrough, means for feeding material and air into the upper end of said passage, the lower end of the rotor terminating above the lower end of said chamber so as to allow the material and air to flow into the lower part of said clearance space, and said rotor having means for creating a cyclonic action in the clearance space so that the material will be reduced by the whirling action of the material and air in said clearance space.

16. A reducing device of the character described comprising a reducing chamber, a rotor mounted therein and having an axial passage therethrough, said rotor being surrounded by a substantial clearance space, means for supplying air and the material to be reduced to the upper end of said passage so that the material and air will be discharged into the bottom of said clearance space, and means associated with the rotor for maintaining an eddy of the mixed air and material within said clearance space so as to draw the mixed air and material upwardly from the bottom of the chamber and effect reduction of the material by the whirling action produced in said clearance space by said rotor.

17. A reducing device of the character described comprising a chamber, a rotor mounted in said chamber and surrounded by a substantial clearance space, said rotor having means for creating an eddy in said clearance space so as to cause a gradual rise of the material being acted upon in the eddy, a separating chamber above the reducing chamber, and means for restricting the passage of the reduced material from the clearance space to the separating chamber.

18. In a reducing device of the character described having a reducing chamber and means for supplying material to be reduced, a rotor having a passage for travel of the material therethrough, said passage communicating with said chamber, and radial wings on the outer side of said rotor positioned to create an eddy in the material-laden air currents within the space between the rotor and the walls of the chamber so as to reduce said material.

19. A reducing device of the character described comprising a chamber, a rotor therein surrounded by a substantial clearance space, radially arranged cutting blades disposed around said clearance space and spaced from the rotor, and means for selectively rotating the rotor in either direction so as to reduce material by the whirling action of the air in said clearance space and also to effect a reverse wear on the cutting edges of the blades to sharpen the same.

20. A reducing device of the character described comprising a chamber, a rotor mounted in said chamber and surrounded by a substantial clearance space, said rotor having a passage therethrough, means for supplying material to be reduced to the passage through said rotor, said rotor acting to discharge the material mixed with air into said clearance space and having means for creating a cyclonic action in said clearance space so that the material will be reduced by the whirling action of the air in said space, a plurality of narrow blades projecting radially into said clearance space from the walls of the chamber and spaced from said rotor, and means for selectively rotating said rotor in either direction.

21. A reducing device of the character described comprising a vertically disposed chamber, a reversibly rotatable rotor mounted axially in said chamber and having a passage therethrough, said rotor being surrounded by a substantial clearance space, means for supplying material to said passage, said rotor having means for creating a cyclonic action in said clearance space so as to discharge the material and air into said space where it may be reduced by the whirling action of the air therein, and a plurality of vertical blades projecting radially inward from the wall of the chamber and surrounding the periphery of said clearance chamber, said blades being spaced from said rotor.

In witness whereof, I hereunto subscribe my name to this specification.

HENRY G. LYKKEN.